United States Patent
Lacaze

(10) Patent No.: US 11,232,711 B2
(45) Date of Patent: Jan. 25, 2022

(54) MESSAGE CONVEYING SYSTEM OF RENDEZVOUS LOCATIONS FOR STRANDED AUTONOMOUS VEHICLES

(71) Applicant: ROBOTIC RESEARCH OPCO, LLC, Clarksburg, MD (US)

(72) Inventor: Alberto Daniel Lacaze, Potomac, MD (US)

(73) Assignee: ROBOTIC RESEARCH OPCO, LLC, Clarksburg, MD (US)

( * ) Notice: Subject to any disclaimer, the term of this patent is extended or adjusted under 35 U.S.C. 154(b) by 233 days.

(21) Appl. No.: 16/365,817

(22) Filed: Mar. 27, 2019

(65) Prior Publication Data

US 2020/0312152 A1    Oct. 1, 2020

(51) Int. Cl.
*G08G 1/00* (2006.01)
*G05D 1/02* (2020.01)
*H04W 4/46* (2018.01)

(52) U.S. Cl.
CPC .......... *G08G 1/202* (2013.01); *G05D 1/0248* (2013.01); *G05D 1/0255* (2013.01); *G05D 1/0293* (2013.01); *G05D 1/0295* (2013.01); *G08G 1/22* (2013.01); *H04W 4/46* (2018.02)

(58) Field of Classification Search
CPC ............ G08G 1/202; G08G 1/22; G08G 1/20; H04W 4/46; H04W 4/44; G05D 1/0248; G05D 1/0255; G05D 1/0293; G05D 1/0295; G05D 1/027; B60W 30/165; B60W 30/17; G01C 21/3438
USPC ......................................... 701/23, 24, 25, 26
See application file for complete search history.

(56) References Cited

U.S. PATENT DOCUMENTS

| | | | | |
|---|---|---|---|---|
| 6,026,292 | A * | 2/2000 | Coppinger | H04M 17/00 455/405 |
| 6,720,920 | B2 * | 4/2004 | Breed | G01S 17/89 342/386 |
| 8,996,224 | B1 * | 3/2015 | Herbach | G05D 1/0044 701/23 |
| 9,475,422 | B2 * | 10/2016 | Hillis | G06F 3/017 |
| 9,612,123 | B1 * | 4/2017 | Levinson | G01C 21/32 |
| 10,216,195 | B2 * | 2/2019 | Switkes | B60W 10/22 |
| 10,698,421 | B1 * | 6/2020 | Harris | H04W 4/40 |
| 10,948,927 | B1 * | 3/2021 | Harris | H04W 4/42 |
| 11,048,271 | B1 * | 6/2021 | Harris | H04W 4/42 |
| 2007/0233304 | A1 * | 10/2007 | Baginski | B66F 9/0755 700/115 |
| 2010/0256852 | A1 * | 10/2010 | Mudalige | G08G 1/22 701/24 |

(Continued)

*Primary Examiner* — Richard A Goldman
(74) *Attorney, Agent, or Firm* — RowanTree Law Group, PLLC; Frederick F. Rosenberger

(57) ABSTRACT

A message conveying system comprising a set of sensors that can detect features such as a camera, LADAR, ranging sensors, or acoustic sensors in which the lead autonomous vehicle conveys messages to the other autonomous vehicles that follow behind of rendezvous locations for the entire convoy to meet when they get separated from the lead autonomous vehicle. The rendezvous locations are derived from paths entered by the operator, by using the general direction of travel, or by using the old route. In addition, different rendezvous points can be chosen based on exactly where the loss of communication occurs. These rendezvous points may or may not lead to the final destination dictated by the lead autonomous vehicle.

16 Claims, 5 Drawing Sheets

(56) References Cited

U.S. PATENT DOCUMENTS

| | | | | |
|---|---|---|---|---|
| 2016/0121983 | A1* | 5/2016 | Rokkan | B63G 8/001 |
| | | | | 114/313 |
| 2017/0293296 | A1* | 10/2017 | Stenneth | G06Q 20/10 |
| 2017/0344023 | A1* | 11/2017 | Laubinger | B60W 50/14 |
| 2018/0128628 | A1* | 5/2018 | Cheaz | H04W 84/00 |
| 2018/0176750 | A1* | 6/2018 | Xu | H04W 4/38 |
| 2018/0202822 | A1* | 7/2018 | DeLizio | G01C 21/3438 |
| 2018/0211546 | A1* | 7/2018 | Smartt | G08G 1/161 |
| 2018/0359619 | A1* | 12/2018 | Ma | H04W 84/20 |
| 2019/0025821 | A1* | 1/2019 | Salomon | G05D 1/0293 |
| 2019/0193582 | A1* | 6/2019 | Matsuoka | G08G 1/22 |
| 2019/0286163 | A1* | 9/2019 | Yasuda | G05D 1/0293 |
| 2019/0373419 | A1* | 12/2019 | Bayley | H04W 76/14 |
| 2020/0080853 | A1* | 3/2020 | Tam | G05D 1/0212 |
| 2020/0092685 | A1* | 3/2020 | Feh | H04B 7/2606 |
| 2020/0174496 | A1* | 6/2020 | Hase | H04W 84/20 |
| 2020/0201356 | A1* | 6/2020 | Schuh | B60T 7/12 |
| 2020/0300649 | A1* | 9/2020 | Kim | G08G 1/202 |
| 2020/0312152 | A1* | 10/2020 | Lacaze | G05D 1/0255 |
| 2020/0324768 | A1* | 10/2020 | Switkes | G08G 1/202 |
| 2021/0064064 | A1* | 3/2021 | DeLizio | G08G 1/0965 |

* cited by examiner

MESSAGE CONVEYING SYSTEM OF RENDEZVOUS LOCATIONS FOR STRANDED AUTONOMOUS VEHICLES

CROSS-REFERENCE TO RELATED APPLICATIONS

Not applicable.

BACKGROUND OF THE INVENTION

1. Field of the Invention

The present invention relates to a system comprising a set of sensors that can detect features such as a camera, LADAR, ranging sensors, or acoustic sensors in which the lead autonomous vehicle conveys messages to other stranded autonomous vehicles in the convoy of rendezvous locations for the convey to meet when the rest of the convoy is separated from the lead autonomous truck. The rendezvous locations are derived from paths entered by the operator, by using the general direction of travel, or by using the old route. In addition, different rendezvous points can be chosen based on where the loss of communication occurs. The rendezvous locations that are chosen may or may not lead to the final destination directed by the lead autonomous vehicle.

2. Description of Related Art

The statements in this section merely provide background information related to the present disclosure and may not constitute prior art.

There is a great need for a system of allowing stranded autonomous vehicles to be reunited with the lead autonomous vehicle for a wide variety of different applications. It would be desirable for the locations of where the autonomous vehicles are reunited to be in areas of friendly territory, places of tactical advantage, or an area that is inputted by the user. This type of system of relaying messages to the autonomous vehicles on rendezvous places to meet upon an explosion, or another calamity using a set of sensors that can see features such as a camera, LADAR, ranging sensors, or acoustic sensors, has not been developed in the patent literature.

There have been several patents that discuss trucks conveying messages to each other, but none in the case where autonomous trucks are stranded from the lead autonomous truck. Also, messages are not sent for specific locations for the convoy to meet. There has been a patent in which signals have been sent to different units of trucks. An industrial truck with an RFID sending and second receiving unit has been developed for sending telegrams as discussed in US Pat. No. 2007/0233304. It is known to equip industrial trucks with a sending and receiving unit for automatic readout of transponders. A vehicle data bus is normally provided to which the electronic units are connected and communicate via so-called telegrams. In this case, the electronic units are connected to each other and there is no loss of communications.

Another patent exists in which when one truck is connected to another truck in a remote station, it can send signals using a sensor, actuator, controller, and transceiver to sense activity by sending a signal to the controller. The sensor generates a signal that is detected by the controller, which then sends the signal to the transreceiver. Once the sensor detects such activity, a signal is sent to alert the controller which then activates an actuator that partly or completely disables the vehicle. It is worth noting that in this case, the two trucks are connected to one another and there is no loss of communication between the vehicles.

There has been a method developed for communication between vehicles in which accidents, weather conditions, and road conditions in vehicle-to-vehicle communications is discussed in U.S. Pat. No. 6,720,920. In this case, there is active communication between the vehicles and no vehicle is left stranded.

A truck communication system has been developed in U.S. Pat. No. 6,026,292 in which email messages can be sent between an authorized user connected to a publicly accessible computer and a vehicle occupant using a private communication system having different messaging formats. In this case, if the vehicle with the private communication system is left stranded, there would be a loss of communication and the email messages could not be sent. Also, in this system, messages are not sent for rendezvous places for the entire convoy to meet.

There are patents related to instant messaging between vehicles, but there is no loss of communication between these vehicles and no communication related to where the convoy should meet. Also, it is possible for detecting an autonomous vehicle in a stuck condition as discussed in U.S. Pat. No. 8,996,224. There is no record of an invention in which a lead autonomous truck sends messages to other autonomous trucks following it of a meeting location when they get separated from the lead autonomous truck.

SUMMARY OF THE INVENTION

The present invention involves a message conveying system comprising a set of sensors such as a camera, LADAR, ranging sensors, and acoustic sensors that can detect features in a road network. The lead autonomous vehicle conveys messages to the rest of the convey when communication is lost to a rendezvous location to meet. The system involves a Road Network Definition File (RNDF) containing a-priori data about the road network. The rendezvous locations are derived from paths entered by the operator, by using general direction of travel, and by using the old route. In addition, the rendezvous point chosen can be different depending on exactly where communication is lost.

The lead autonomous vehicle constantly sends rendezvous plans to the other autonomous vehicles in the convoy while communications are still active. Once communications break down, the other autonomous vehicles in the convoy follow the rendezvous plans that the lead autonomous vehicle conveyed prior to loss of communication. In addition, the convoy of autonomous vehicles also sends alerts that it is no longer in direct contact with the lead autonomous vehicle.

The rendezvous plan is chosen by the lead autonomous vehicle, Autonomy kit, such that it has good characteristics such as friendly territory or a place of tactical advantage, in the direction of travel, or it can be provided by the user.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF INVENTION

The particulars shown herein are given as examples and are for the purposes of illustrative discussion of the embodiments of the present invention only and are presented in the cause of providing what is believed to be the most useful and readily understood description of the principles and conceptual aspects of the present invention.

The invention involves the development of a message relaying system comprising a set of sensors that can see features in a road network such as a camera, LADAR, ranging sensor, or acoustic sensor. There is a road network and there is a communication mechanism between the database of the lead autonomous vehicle and the autonomous vehicles that come behind. There is also a localization system that exists in both the lead autonomous vehicle and the autonomous vehicles coming behind. Here, a lead autonomous vehicle constantly sends messages to the other autonomous vehicles coming behind in the convoy of rendezvous locations to meet in case the autonomous vehicles get separated from the lead autonomous vehicle due to disasters such as explosions and other calamities. There is a Road Network Definition File (RNDF) containing a-priori data about the road network from the path entered by the operator, by using the general direction of travel, or by using the old route. The constant messaging system allows the convoy of vehicles to use the latest message from the lead autonomous vehicle to get to the rendezvous location. The rendezvous locations are derived from paths entered by the operator, by using the general direction of travel, and by using the old route. In addition, different rendezvous locations can be chosen depending on when the communication is lost between the lead autonomous vehicle and the rest of the autonomous vehicles coming behind. These rendezvous points may or may not lead to the final destination that is directed by the lead autonomous vehicle.

Figure 1:
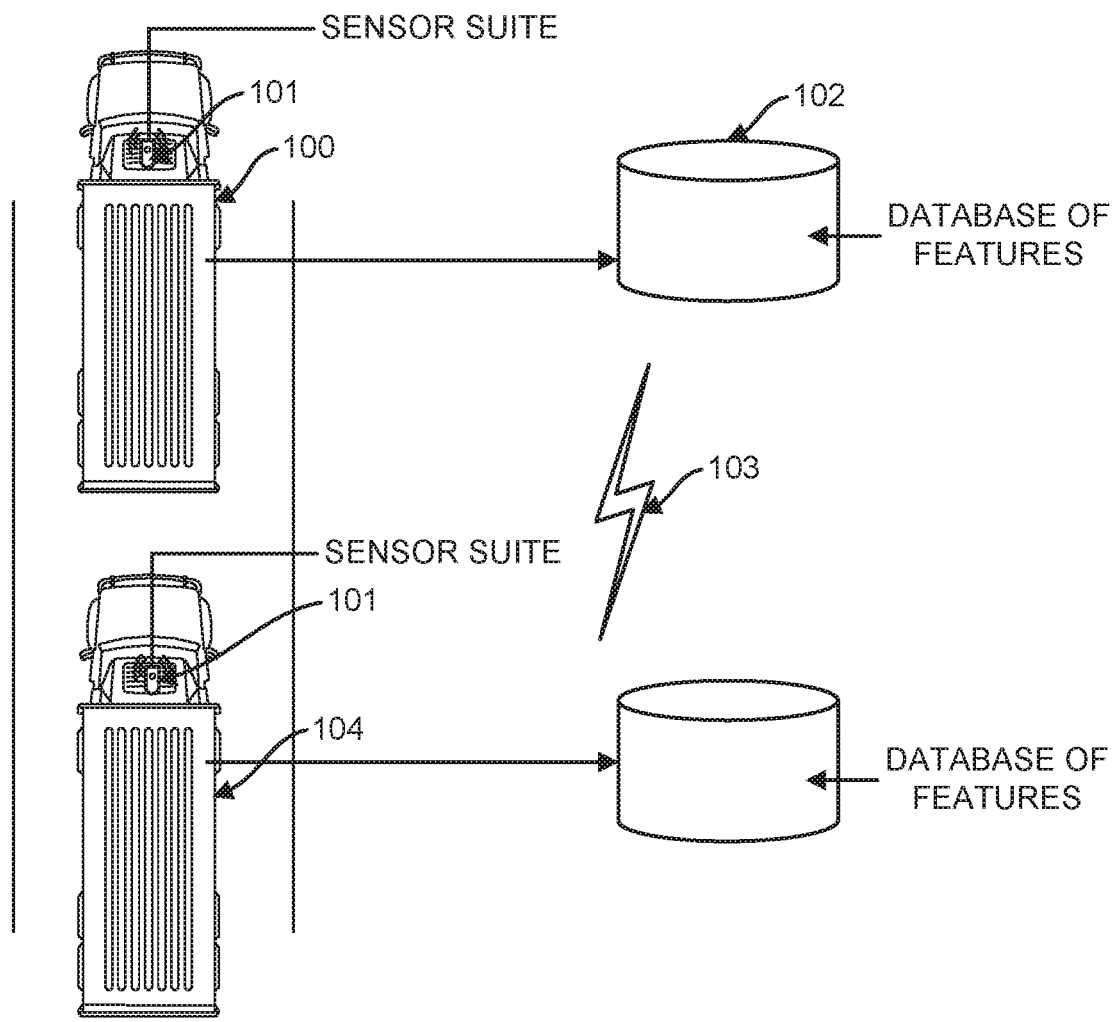
FIG. 1 shows a schematic of the sensor suite (101) present on the lead autonomous vehicle (100) and the autonomous vehicle following behind (104). There is a database of features (102) in both autonomous vehicles and a communication mechanism (103) between them.

FIG. 1 shows a schematic of the sensors on the autonomous vehicles, the database of features, and the communication mechanism along a road network. There is a set of sensor suites in the lead autonomous vehicle and the autonomous vehicle coming behind. There is a database of features in each of the autonomous vehicles and a communication mechanism in which the features that are sensed by the lead autonomous vehicle is transmitted to the autonomous vehicle following behind it. There is a localization system in both of the autonomous vehicles.

Figure 2:
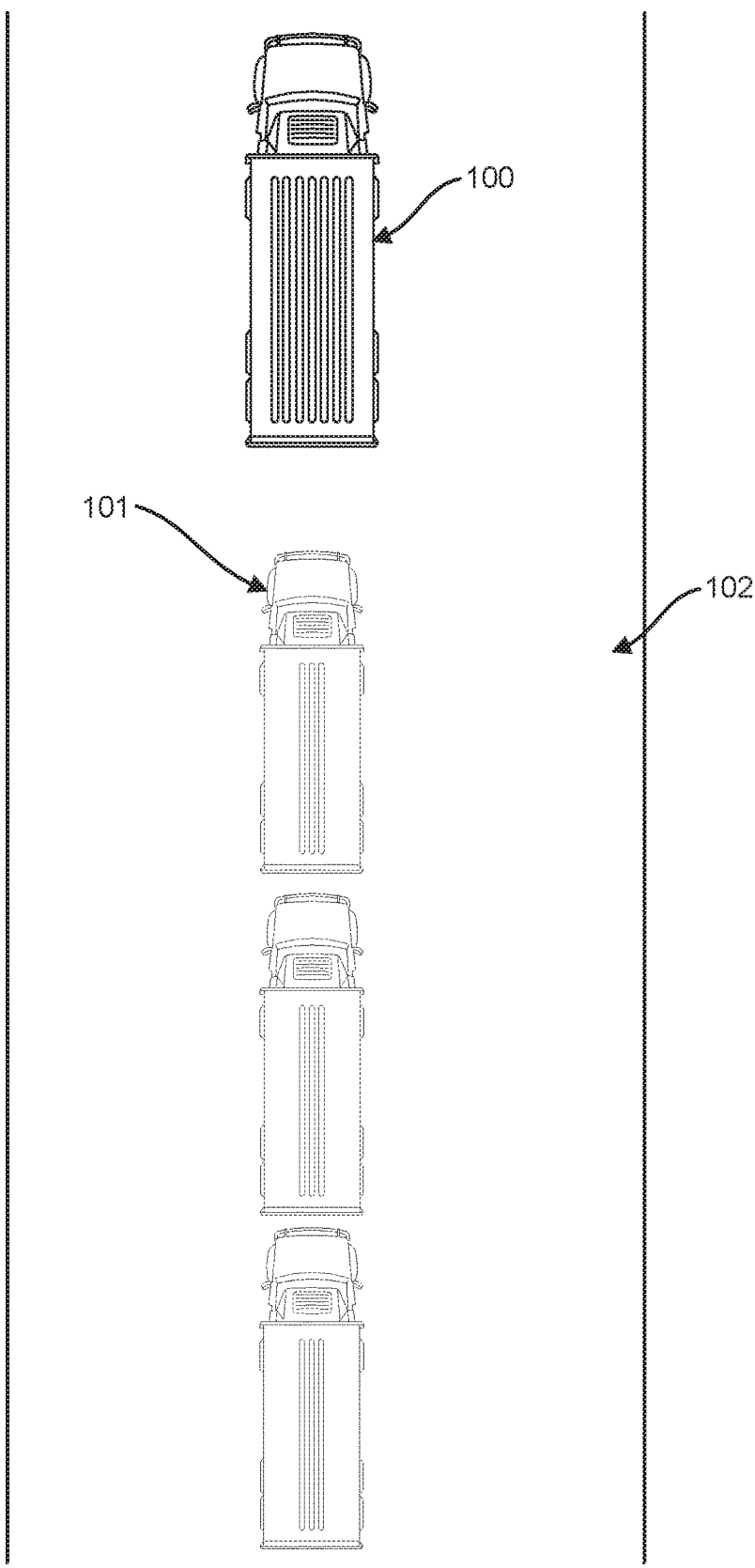
FIG. 2 shows a figure of the autonomous vehicles (101) that follow the lead autonomous vehicle (100) in a road (102) containing a bridge.

FIG. 2 shows a convoy of autonomous vehicles that is led by a lead autonomous vehicle that constantly sends messages via the communication mechanism to the database of the other autonomous vehicles in the convoy of rendezvous places to meet in case the autonomous vehicles get separated.

Figure 3:
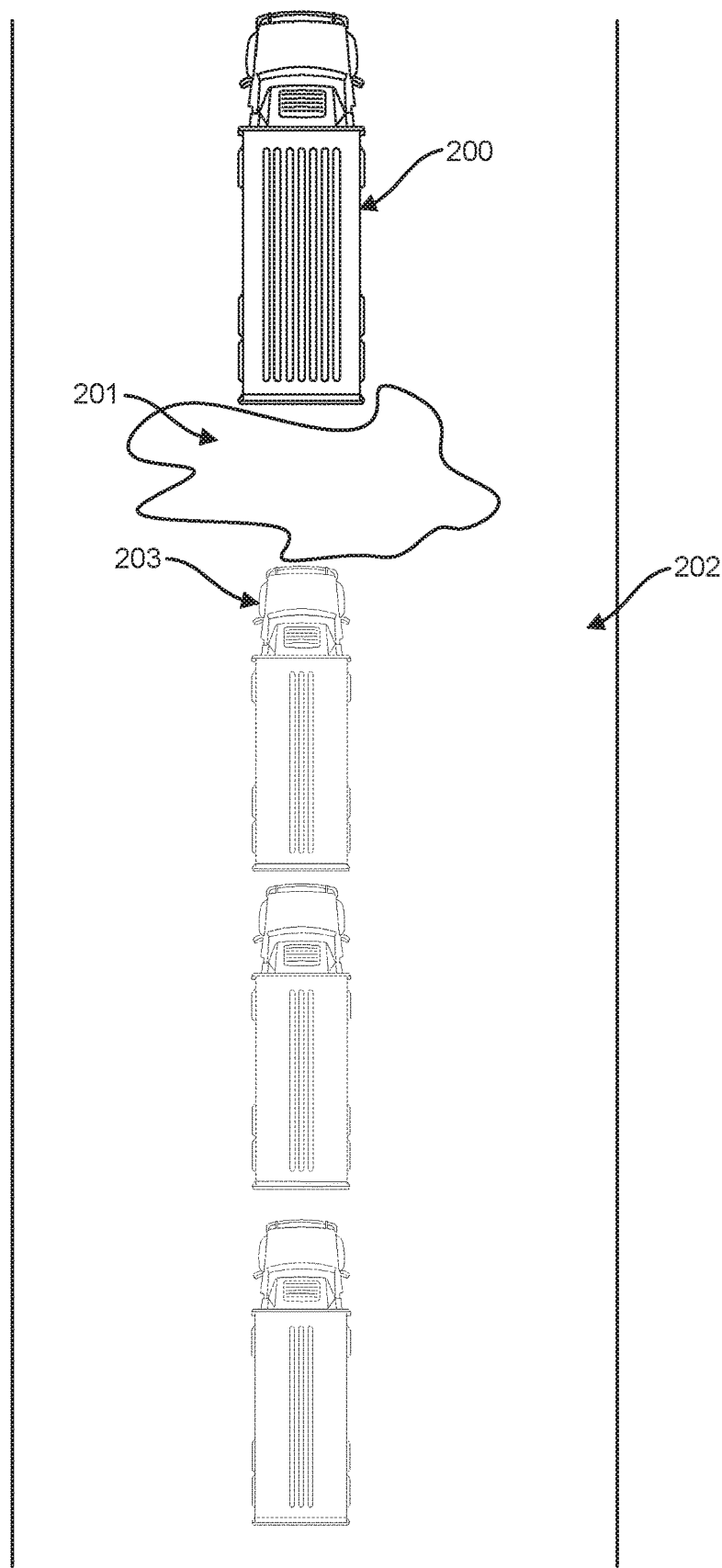
FIG. 3 shows an explosion (201) that occurs during the middle of the convoy of autonomous vehicle (203) that destroys the bridge (202) leaving the rest of the convoy stranded from the lead autonomous vehicle (200).

FIG. 3 shows the loss of communication between the database of the lead autonomous vehicle and the other autonomous vehicles that occurs in the convoy in the case of an explosion or other type of disaster that occurs in the middle of the convoy.

Figure 4:
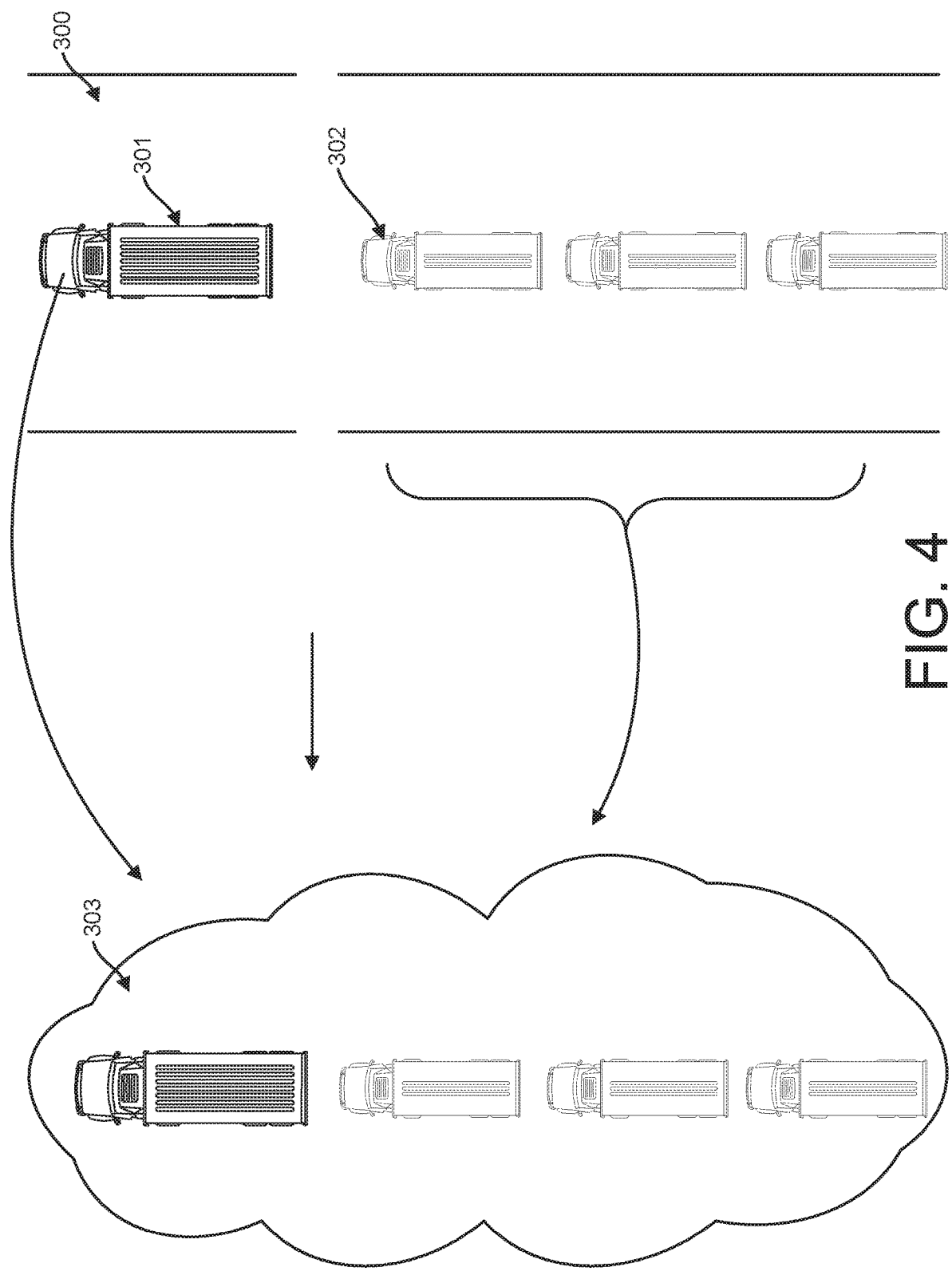
FIG. 4 shows the entire convoy of autonomous vehicles meeting up in a rendezvous location (303) based on the constant flow of messages conveyed by the lead autonomous vehicle (301) prior to loss of communication. It also shows how the convoy (302) is stranded from the lead autonomous vehicle (301) due to the destruction of the bridge (300).
Figure 5:
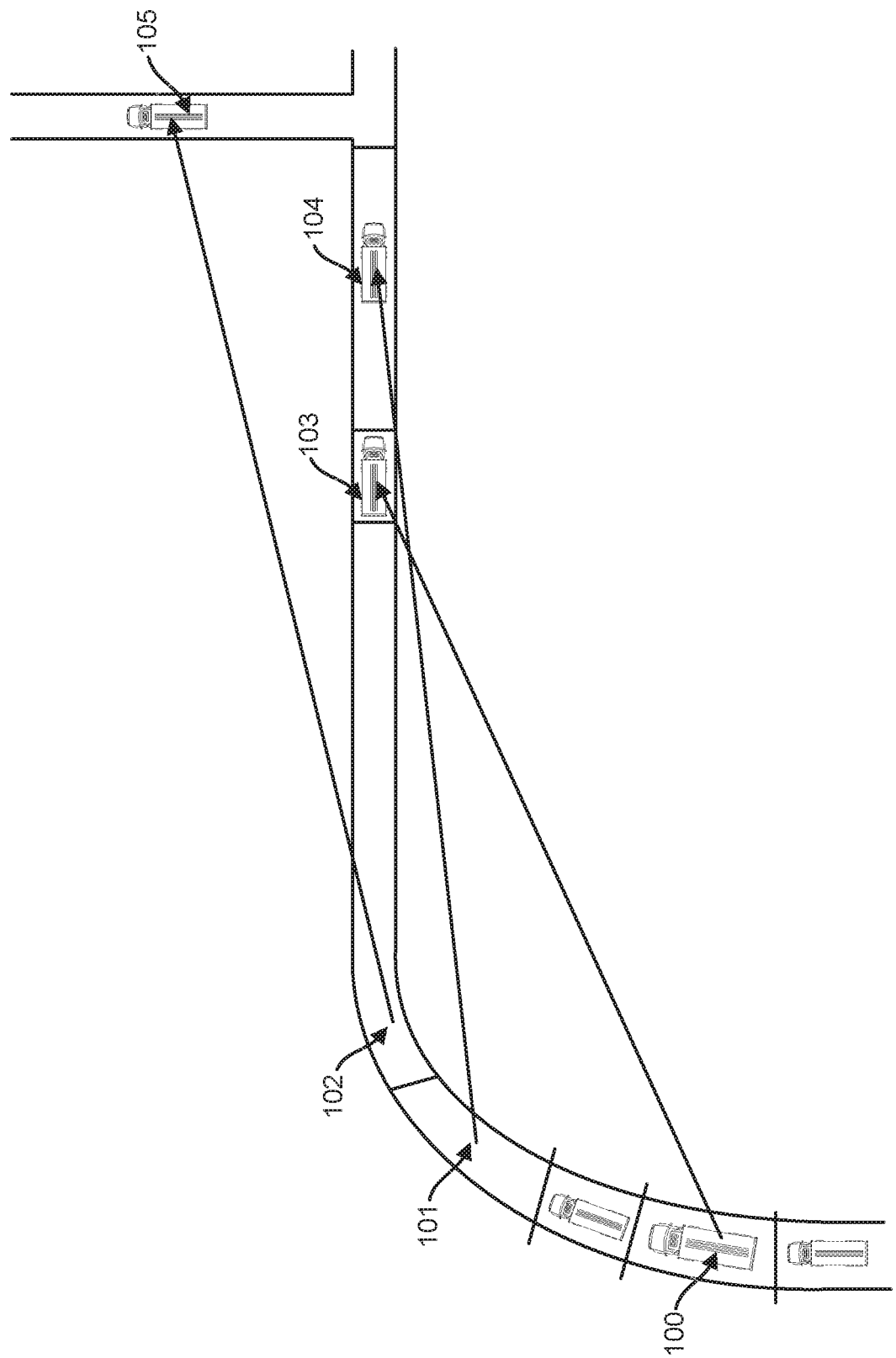
FIG. 5 shows the convoy of autonomous vehicles (500) meeting up at different predetermined rendezvous points (503, 504, 505) depending on where the communication is lost (500, 501, 502).

FIG. 4 shows the lead autonomous vehicle being able to send messages to the database of other autonomous vehicles via a communication mechanism despite loss of communications for a place for the entire convoy to meet. This is done by the lead autonomous vehicle constantly sending signals to the other autonomous vehicles via a communication mechanism from the database of the lead autonomous vehicle and the database of the other autonomous vehicles. Then, once loss of communications occur, the other autonomous vehicles follow the messages last received from the lead autonomous vehicle. The lead autonomous vehicle, Autonomy kit, chooses a rendezvous location that has some good characteristics such as a friendly territory, a place of tactical advantage, a place in the direction of travel, or a place provided by the user.

FIG. 4 shows the convoy of autonomous vehicles meeting up at several predetermined rendezvous locations depending on when exactly the loss of communications occurs. These predetermined rendezvous locations may or may not lead to the final rendezvous destination determined by the lead autonomous vehicle.

The convey of autonomous trucks also sends alerts that it is no longer in direct contact with the lead autonomous truck.

The embodiments of the invention in which an exclusive property or privilege is claimed are defined as follows:

1. A system for controlling a convoy of multiple autonomous vehicles, the system comprising:
    a first message conveying system mounted on a lead autonomous vehicle in the convoy, the first message conveying system comprising:
    a transmitter; and
    a first database storing data about a road network traversed by the lead autonomous vehicle; and
    a second message conveying system mounted on a follower autonomous vehicle in the convoy, the second message conveying system comprising:
    a receiver; and
    a second database storing data about the road network,
    wherein the first message conveying system is configured to:
        determine, based at least in part on a predetermined first travel route for the lead autonomous vehicle and the data in the first database, a rendezvous location; and
        transmit, via the transmitter to the receiver of the second message conveying system, a message indicating the determined rendezvous location, and
    wherein the second message conveying system is configured to:
        receive, via the receiver from the transmitter of the first message conveying system, the message indicating the determined rendezvous location;

determine that communication between the first message conveying system and the second message conveying system has been lost; and in response to the determination of loss of communication, control the follower autonomous vehicle to follow a second travel route to the determined rendezvous location.

2. The system of claim 1, further comprising:
a first sensor suite mounted on the lead autonomous vehicle; and
a second sensor suite mounted on the follower autonomous vehicle,
wherein each of the first and second sensor suites comprises a camera, a laser detection and ranging system (LADAR), a ranging sensor, an acoustic sensor or any combination of the foregoing,
wherein the first sensor suite is configured to detect features in the road network as the lead autonomous vehicle traverses the predetermined first travel route,
wherein the first message conveying system is further configured to transmit, via the transmitter to the receiver of the second message conveying system, a message indicating the detected features, and
wherein the second message conveying system is further configured to receive, via the receiver from the first message conveying system, the message indicating the detected features.

3. The system of claim 1, wherein the data about the road network comprises a Road Network Definition File containing a-priori data about the road network.

4. The system of claim 1, wherein:
the first message conveying system further comprises a second receiver;
the second message conveying system further comprises a second transmitter; and
the second message conveying system is further configured to transmit, via the second transmitter to the second receiver of the first message conveying system, a message that acknowledges that communications are still active.

5. A The system of claim 1, wherein the first message conveying system of the lead autonomous vehicle is configured to determine the rendezvous location by selecting from a predetermined list of potential rendezvous locations.

6. The system of claim 4, wherein:
the second message conveying system is further configured to, in response to the determination of loss of communication, transmit, via the second transmitter, an alert that the follower autonomous vehicle is no longer in contact with the lead autonomous vehicle.

7. The system of claim 4, wherein the first message conveying system is further configured to:
determine that communication between the second message conveying system and the first message conveying system has been lost; and
in response to the determination of loss of communication, control the lead autonomous vehicle to follow a third travel route to the determined rendezvous location.

8. The system of claim 7, wherein the third travel route includes a detour from the predetermined first travel route.

9. A system for controlling a convoy of multiple autonomous vehicles, the system comprising:
a first message conveying system mounted on a lead autonomous vehicle in the convoy, the first message conveying system comprising:

a first transmitter;
a first receiver; and
a first database storing data about a road network traversed by the lead autonomous vehicle; and
a second message conveying system mounted on a follower autonomous vehicle in the convoy, the second message conveying system comprising:
a second transmitter;
a second receiver; and
a second database storing data about the road network,
wherein the first message conveying system is configured to:
determine, based at least in part on a current first location along a predetermined travel route for the lead autonomous vehicle and the data in the first database, a first rendezvous location; and
transmit, via the first transmitter to the second receiver of the second message conveying system, a first message indicating the determined first rendezvous location,
wherein the second message conveying system is configured to:
receive, via the second receiver from the first transmitter of the first message conveying system, the first message indicating the determined first rendezvous location; and
transmit, via the second transmitter to the first receiver of the first message conveying system, a second message acknowledging that communications are still active,
wherein the first message conveying system is further configured to:
receive, via the first receiver, the second message from the second transmitter of the second message conveying system;
determine, based at least in part on a current second location along the predetermined travel route, a second rendezvous location different from the first rendezvous location;
transmit, via the first transmitter to the second receiver, a third message indicating the determined second rendezvous location, and
wherein the second message conveying system is further configured to:
receive, via the second receiver from the first transmitter, the third message indicated the determined second rendezvous location;
after receiving the third message, determine that communication between the first message conveying system and the second message conveying system has been lost; and
in response to the determination of loss of communication, control the follower autonomous vehicle to follow a second travel route to the determined second rendezvous locations.

10. The system of claim 9, wherein the first rendezvous location, the second rendezvous location, or both the first and second rendezvous locations are along the predetermined travel route to a final destination for the convoy.

11. The system of claim 9, wherein the first rendezvous location, the second rendezvous location, or both the first and second rendezvous locations are not along the predetermined travel route to a final destination for the convoy.

12. The system of claim 9, wherein the second travel route followed by the follower autonomous vehicle includes a detour from the predetermined travel route.

13. The system of claim 9, further comprising:
a first sensor suite mounted on the lead autonomous vehicle; and
a second sensor suite mounted on the follower autonomous vehicle,
wherein each of the first and second sensor suites comprises a camera, a laser detection and ranging system (LADAR), a ranging sensor, an acoustic sensor, or any combination of the foregoing,
wherein the first sensor suite is configured to detect features in the road network as the lead autonomous vehicle traverses the predetermined travel route,
wherein the first message conveying system is further configured to transmit, via the first transmitter to the second receiver of the second message conveying system, a fourth message indicating the detected features, and
wherein the second message conveying system is further configured to receive, via the second receiver, the fourth message indicating the detected features.

14. The system of claim 9, wherein the first message conveying system is further configured to determine the first rendezvous location, the second rendezvous location, or both the first and second rendezvous locations by selecting from a predetermined list of potential rendezvous locations.

15. The system of claim 9, wherein the second message conveying system is further configured to, in response to the determination of loss of communication, transmit, via the second transmitter, an alert that the follower autonomous vehicle is no longer in contact with the lead autonomous vehicle.

16. The system of claim 9, wherein the first message conveying system is further configured to:
after transmitting the second message, determine that communication between the second message conveying system and the first message conveying system has been lost; and
in response to the determination of loss of communication, control the lead autonomous vehicle to follow a third travel route to the determined second rendezvous location.

* * * * *